United States Patent [19]

Fukuda et al.

[11] 4,330,886
[45] May 18, 1982

[54] AUTOMATIC TELEPHONE EXCHANGE SYSTEM FOR BOTH SPEECH SIGNALS AND DATA TRANSFER

[75] Inventors: Takeo Fukuda; Kazuhiko Hanawa, both of Yokohama; Kiyoshi Urui, Tokyo, all of Japan

[73] Assignee: Tokyo Shibaura Electric Co., Ltd., Kawasaki, Japan

[21] Appl. No.: 162,205

[22] Filed: Jun. 23, 1980

Related U.S. Application Data

[63] Continuation of Ser. No. 898,986, Apr. 21, 1978, abandoned.

[30] Foreign Application Priority Data

Apr. 22, 1977 [JP] Japan .................................. 52/46604

[51] Int. Cl.³ .................... H04M 11/00; H04Q 11/04
[52] U.S. Cl. .................................. 370/62; 179/2 DP
[58] Field of Search ............ 179/18 AD, 99 M, 18 B, 179/2 DP; 370/62, 110

[56] References Cited

U.S. PATENT DOCUMENTS

| | | | |
|---|---|---|---|
| 3,395,254 | 7/1968 | Sweet | 370/62 |
| 3,914,559 | 10/1975 | Knollman | 179/99 |
| 3,973,085 | 8/1976 | Shiff | 179/99 |
| 3,985,959 | 10/1976 | Komine et al. | 179/18 AD X |
| 4,007,334 | 2/1977 | McDonald | 370/110 |
| 4,070,551 | 1/1978 | Weir | 370/56 |

OTHER PUBLICATIONS

"A Prototype Digital Private Telephone Exchange", Tritton & Cullen, *GEC Journal of Science and Technology*, vol. 43, No. 2, pp. 85-95, 1976.

*Primary Examiner*—Thomas W. Brown
*Attorney, Agent, or Firm*—Oblon, Fisher, Spivak, McClelland & Maier

[57] ABSTRACT

Telephones are coupled with data terminal equipments through data lines. The data lines are used to transfer the terminal data between the data terminal equipments and the telephones. Speech signals are transferred between the telephones and a PCM telephone exchange through speech lines. Control lines are used for transferring a time-division-multiplexed signal made of telephone control signals such as lamp energizing signals, and the terminal data, and also used for transferring another time-division-multiplexed signal made of function signals such as function key actuation signals and the terminal data. With such a connection, a speech signal is transferred between telephones through the PCM telephone exchange and speech lines and the terminal data are transferred through the control lines and the PCM telephone exchange.

2 Claims, 6 Drawing Figures

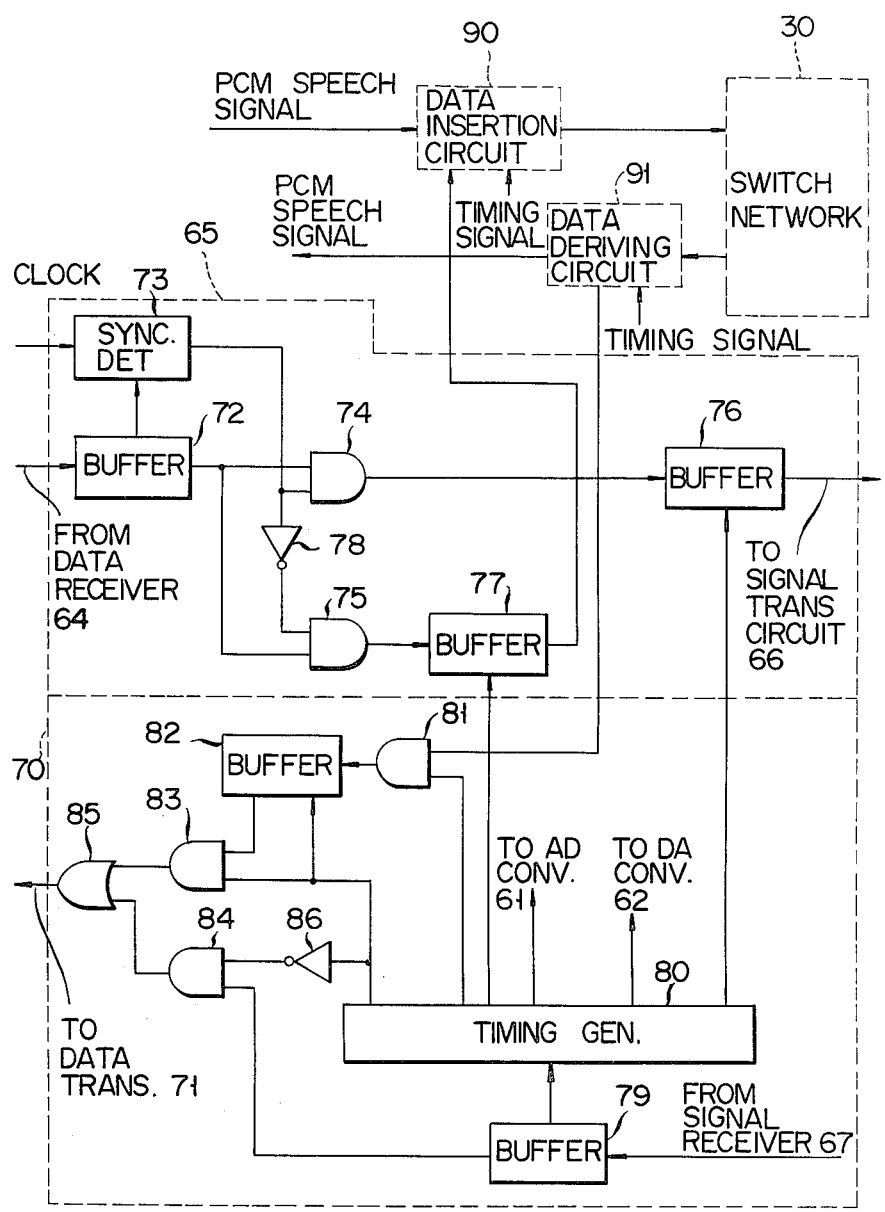

and perform transmission and reception of the data to and from the corresponding data terminal equipments 26a to 26k.

AUTOMATIC TELEPHONE EXCHANGE SYSTEM FOR BOTH SPEECH SIGNALS AND DATA TRANSFER

This application is a continuation of U.S. patent application Ser. No. 898,986, filed Apr. 21, 1978, now abandoned.

BACKGROUND OF THE INVENTION

The invention relates to an automatic telephone exchange system for exchanging and controlling telephones and data terminal equipments through a PCM telephone exchange.

Teletypewriter, CRT display, telephone facsimile and still picture transmission systems can be used as data terminal equipments to be exchanged and controlled by the automatic telephone exchange system of this invention.

For exchanging and controlling telephones and data terminal equipments by the PCM telephone exchange, telephones and the subscriber circuits of the telephone exchange, by convention, are connected by speech lines and control lines. Data terminal equipments and the other subscriber circuits of the telephone exchange are connected by data lines. The subscriber circuits for telephones in the telephone exchange transfer the speech signal through the speech lines and transfers the telephone control signals and the function signals through the control line. The subscriber circuits for data terminal equipments transfer the terminal data through the terminal data line.

With the above-mentioned prior telephone exchange system, when telephones or data terminal equipments are extended, the subscriber circuits for the exchange must correspondingly be increased. This leads to bulkiness and complexity of the system construction and increase of the system cost.

SUMMARY OF THE INVENTION

Accordingly, an object of the invention is to provide an automatic telephone exchange system with the minimum number of subscriber circuits necessary for a set of telephone and at least one data terminal equipment.

In brief, an automatic telephone exchange system of the invention exchanges and controls telephones and data terminal equipments through a PCM telephone exchange. The telephones are connected to the subscriber circuits of the exchange. At least one data terminal equipment is connected to a prescribed telephone. Telephone control signals and terminal data are time-division-multiplexed with each other and function signals such as function key actuation signals and terminal data are time-division-multiplexed with each other.

More particularly, there is provided an automatic telephone exchange system comprising: a PCM telephone exchange; a plurality of telephones which are connected to the PCM telephone exchange through speech lines and control lines, and in which the communication of the speech signal is made through the speech lines and telephone control signals and function signals are selectively transferred through the control lines; and at least one data terminal equipment connected to a prescribed telephone, wherein the PCM telephone exchange is comprised of means for converting the speech signal transferred through the speech line into a PCM signal, means for inserting terminal data signal transferred through said control line into the converted PCM signal at a predetermined timing, and means for extracting the terminal data inserted.

BRIEF DESCRIPTION OF THE DRAWING

FIG. 6 shows a block diagram of distribution and mixing circuits shown in FIG. 5.

DESCRIPTION OF THE PREFERRED EMBODIMENTS

Figure 1:
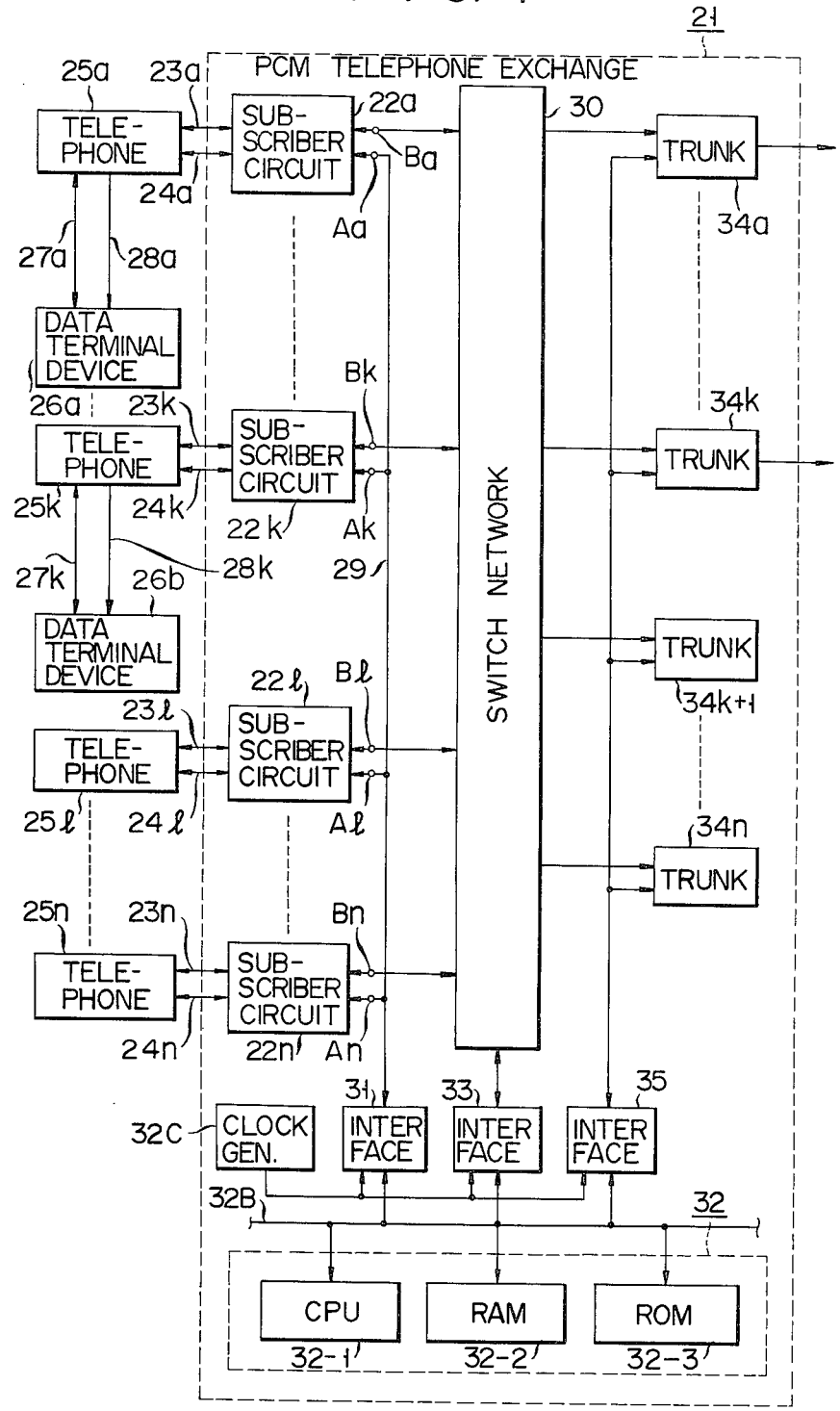
FIG. 1 shows a block diagram of an automatic telephone exchange system according to the invention.

FIG. 1 shows an embodiment of an automatic telephone exchange system according to the invention. In the figure, a PCM telephone exchange of stored program type is enclosed by a dotted line and generally designated by reference numeral 21. As shown, control signal input/output terminals Aa to An of subscriber circuits 22a to 22n are connected to a control unit 32, through a subscriber control line 29, an interface 31 and a bus line 32B. The control unit 32 is comprised of a central processing unit (CPU) 32-1, a random access memory (RAM) 32-2 and a read only memory (ROM) 32-3. The control unit 32 is connected to a switch network 30 in the PCM telephone exchange 21, via the bus line 32B and an interface 31. The control unit 32 is also connected to trunks 34a to 34n, via the bus line 32B and an interface 35. Speech signal input/output terminals Ba to Bn of the subscriber circuits 22a to 22n are connected to the switch network 30 which is also connected to the trunks 34a to 34n. A clock signal generator 32c is connected to the interfaces 31, 33 and 35.

Reference numerals 25a to 25n are representative of telephones each connected through a pair of speech lines 23a to 23n and a pair of control lines 24a to 24n to the corresponding subscriber circuits 22a to 22n. An arbitrary number of telephones, for example, 25a to 25k, are connected to data terminal equipments 26a to 26k through data lines 27a to 27k and terminal control lines 28a to 28k, respectively. The telephones 25a to 25k transmit and receive data to and from the data terminal equipments 26a to 26k, respectively. Additionally, the telephones receive a multiplex signal of the terminal data and the telephone control signals such as lamp energizing signals from the PCM telephone exchange 21 and transmit a multiplex signal of the terminal data and function signals such as function key actuation signals, through control lines 24a to 24k in a time-division fashion. The telephone control signals and function signals are referred to as control signals in this specification.

The subscriber circuits 22a to 22n each serve to convert an analogue speech signal transmitted from the telephones 25a to 25n into a PCM signal by an A-D converter therein, and then transmit the PCM signal to the switch network 30. Further, each subscriber circuit 22a to 22n receives a PCM signal from the switch network 30 and converts it into a corresponding analogue signal which in turn is applied to the corresponding telephones 25a to 25n. The telephones 25a to 25k and the associated subscriber circuits 22a to 22k cooperate to time-division-multiplex the terminal data relating to the data terminal equipments 25a to 25k and the control signal and handle the multiplex signal for data communication. Accordingly, the telephones 25a to 25n control the distribution and mixing of the terminal data relating to the data terminal equipments and control signals, by using a synchronizing signal included in the control signals sent from the subscriber circuits 22a to 22k. The data lines 27a to 27k between the telephones 25a to 25k and data terminal equipments 26a to 26k are used for transmission of the terminal data therebetween. The terminal control lines 28a to 28k are for transmission of the clock signals from the telephones 25a to 25k to the terminal equipments 26a to 26k. Each subscriber circuit 22a to 22k separates the multiplex signal transmitted from the corresponding telephones 25a to 25k into the terminal data, the synchronous signals, and other signals, and time-division-multiplexes the terminal data and the corresponding PCM signals to be directed to the switch network 30. The PCM signals are properly exchanged in the switch network 30. The subscriber circuits 22a to 22k separate the multiplex signal from the switch network 30 into the PCM speech signal and the terminal data. The terminal data separated is then time-division-multiplexed with the telephone control signal and is in turn applied to the telephones 25a to 25n. The ROM 32-3 and RAM 32-2 in the control unit 32 each stores a program to provide various exchanging services depending on signals transmitted from the data terminal equipments 26a to 26k via subscriber circuits 22a to 22k and the information relating to the subscriber circuits which have been stored in the ROM 32-3. Under control of the program stored, the control circuit 32 operates to transmit a control signal to the telephones 25a to 25n and the data terminal equipments 26a to 26k, by way of the bus line 32B, the interface 31, the subscriber control line 29, and the subscriber circuits 22a to 22n. The control unit 32 also performs a storage of the terminal data or an exchange service of the same depending on a signal transmitted from the data terminal equipments 26a to 26k via the subscriber circuits 22a to 22k and the information relating to the condition of the data terminal equipments 22a to 22n stored in the RAM 32-2. Additionally, the control unit 32 controls the switch network 30 through the interface 33 to control exchanging of the PCM speech signal and the terminal data inserted therein between the subscriber circuits 22a to 22n, in addition to the exchanging service of the terminal data. The trunks 34a to 34n are controlled by the control unit 32 through the interface 35.

The telephone 25a, by way of example, will be described with reference to FIG. 2.

A hybrid circuit 36 connected to the control line 24a is connected at the output to a receiver 37 where the receiving signal is wave-shaped and amplified. The output of the receiver 37 is supplied to a distributing circuit 38. The distributing circuit 38 detects a specified code or a pilot signal included in the input receiving signal to judge whether the input receiving signal is the telephone control signal or the terminal data. The terminal data judged are delivered to the data line 27a; the telephone control signal judged to a decoder 39. The decoder 39 decodes the input control signal and applies the decoded signal to the control memory 40. The memory 40 stores the input signal and controls a receiving signal switching circuit 41 and a transmitting signal switching circuit 42. The memory signal from the memory 40 is applied to a display unit 43 comprising light emission diodes, for example, where it is visualized. The switching circuit 41 is connected to the receiving signal output terminal of a hybrid circuit 44 and the transmitting signal switching circuit 42, to the transmitting input terminal of the circuit 44. With this connection, the switching circuit 41 permits the speech signal from the hybrid circuit 44 to selectively pass to the receiver (not shown) of a handset 45 or a speaker 46. Another switching circuit 42 permits the speech signal from the transmitter (not shown) of the handset 45 or from a microphone 47 to selectively pass to the speech line 23a by way of the hybrid circuit 44.

A key section 48 is comprised of various kinds of function keys and their associated circuits. The states of the circuits are detected by the scanning signal from a scanning circuit 49. That is, the states, i.e. the operation, of the function keys are detected by the scanning circuit 49. The function signal from the scanning circuit 49 is encoded by an encoder 50 and then is applied to a mixer 51. The mixer 51 multiplexes the function signal and the terminal data signal sent from the data terminal equipment 26a through the data line 27a in time-division fashion. The multiplex signal from the mixer 51 is applied through the transmitter 52 and the hybrid circuit 36 to the control line 24a.

Figure 2:
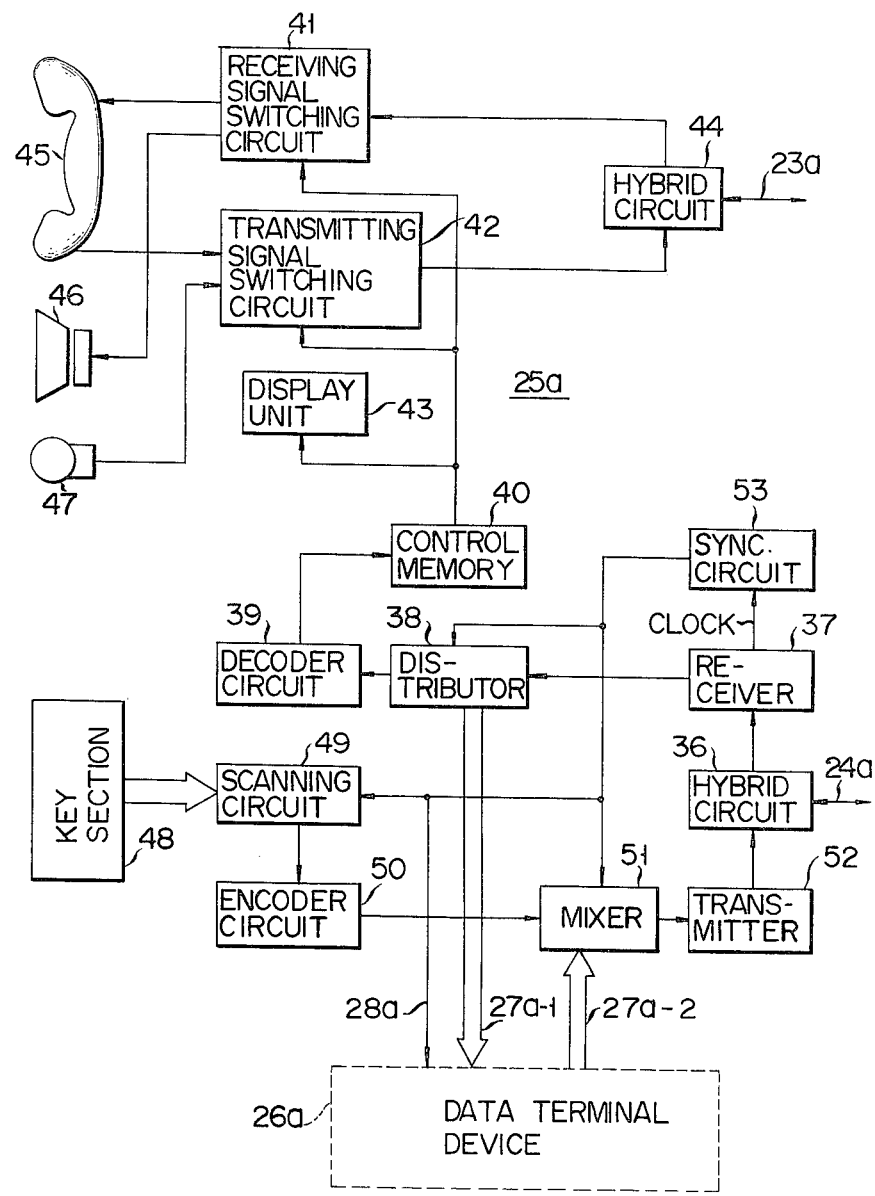
FIG. 2 shows a concrete block circuit diagram of a telephone shown in FIG. 1.

In FIG. 2, reference numeral 53 designates a synchronizing circuit to extract a synchronizing signal and a clock signal from the receiving signal in the receiver 37 and to feed timing signals to the distributing circuit 38 and the mixer 51 and clock signal to the data terminal through the terminal control line 28a, on the basis of the synchronizing signal and the clock signal extracted.

With such a construction, the telephone 25a can transmit and receive the speech signals through the speech line 23a and the control signals and the terminal data through the control line 24a in time-division fashion.

Figure 3:
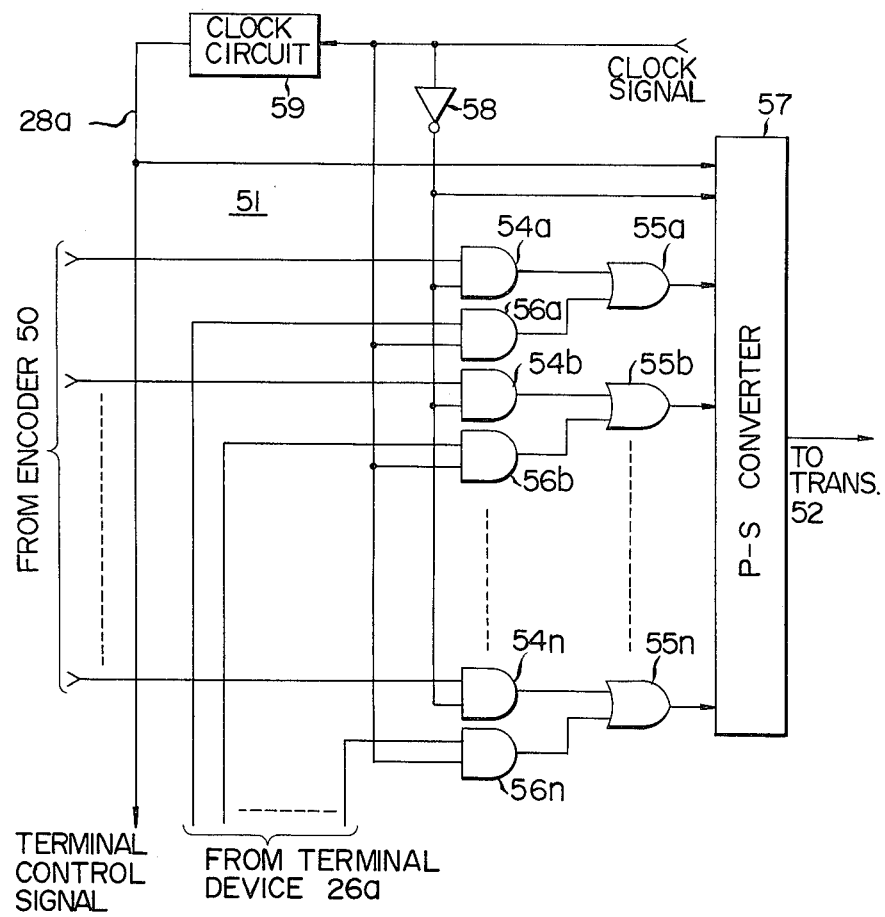
FIG. 3 shows a circuit diagram of a transmission signal mixing circuit shown in FIG. 2.

Referring now to FIG. 3, there is shown the details of the mixer 51. As shown, the function signal transferred from the encoder 50 (FIG. 2) are applied to one input terminals of AND gates 54a to 54n of which the output terminals are connected to one input terminals of OR gates 55a to 55n. The terminal data signal from the data terminal equipment 26a (FIG. 1), for example, is applied to one input terminals of AND gates 56a to 56n of which the output signals are coupled with the other input terminals of the OR gates 55a to 55n. The output signals of the OR gates 55a to 55n are parallely inputted to a parallel to series converter 57 comprising a shift register and the like, in which they are converted into a series signal. The clock pulse from the synchronizing circuit 53 (FIG. 2) is applied to the other input terminals of the AND gates 56a to 56n. The same clock pulse is applied through an inverter 58 to the other input terminals of the AND gates 54a to 54n. With this connection, the AND gates 56a to 56n and the AND gates 54a to 54n are alternately gated. The clock pulse from the synchronizing circuit 53 (FIG. 2) also is applied to a clock circuit 59 where it is differentiated and the differentiated one is outputted as the clock signal onto a terminal control line 28a.

Figure 4:
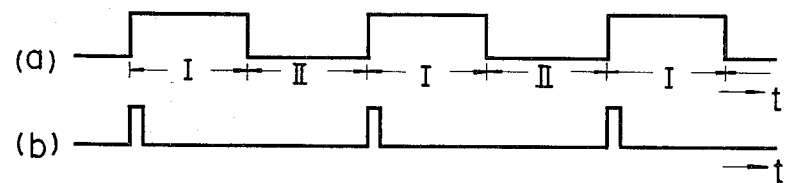
FIG. 4 shows a set of timing diagrams useful in explaining the operation of the circuit in FIG. 3.

The operation of the mixer circuit just mentioned is schematically shown in FIG. 4. As shown in FIG. 4(a), during the period I of the clock signal, the AND gates 56a to 56n are enabled to permit the terminal data to the OR gates 55a to 55n. During the period II, the AND gates 54a to 54n are enabled to permit the function signal to pass to the OR gates 55a to 55n. FIG. 4(b)

shows the waveform of the terminal control signal from the clock circuit 59 (FIG. 3). At the leading edge of the terminal control signal, the AND gates 56a to 56n are enabled to permit the data from the data terminal equipment 26a to go to the OR gates 55a to 55n. Accordingly, the terminal data and the function signal alternately pass through the OR gates 55a to 55n every half period of the clock pulse signal which in turn travels through the parallel to series converter 57 to the data transmitter 52 (FIG. 2). Note here that these signals are transferred in time-division fashion. As a consequence, the control line 24a is effectively used, resulting in improvement of the data transmission effect.

Figure 5:
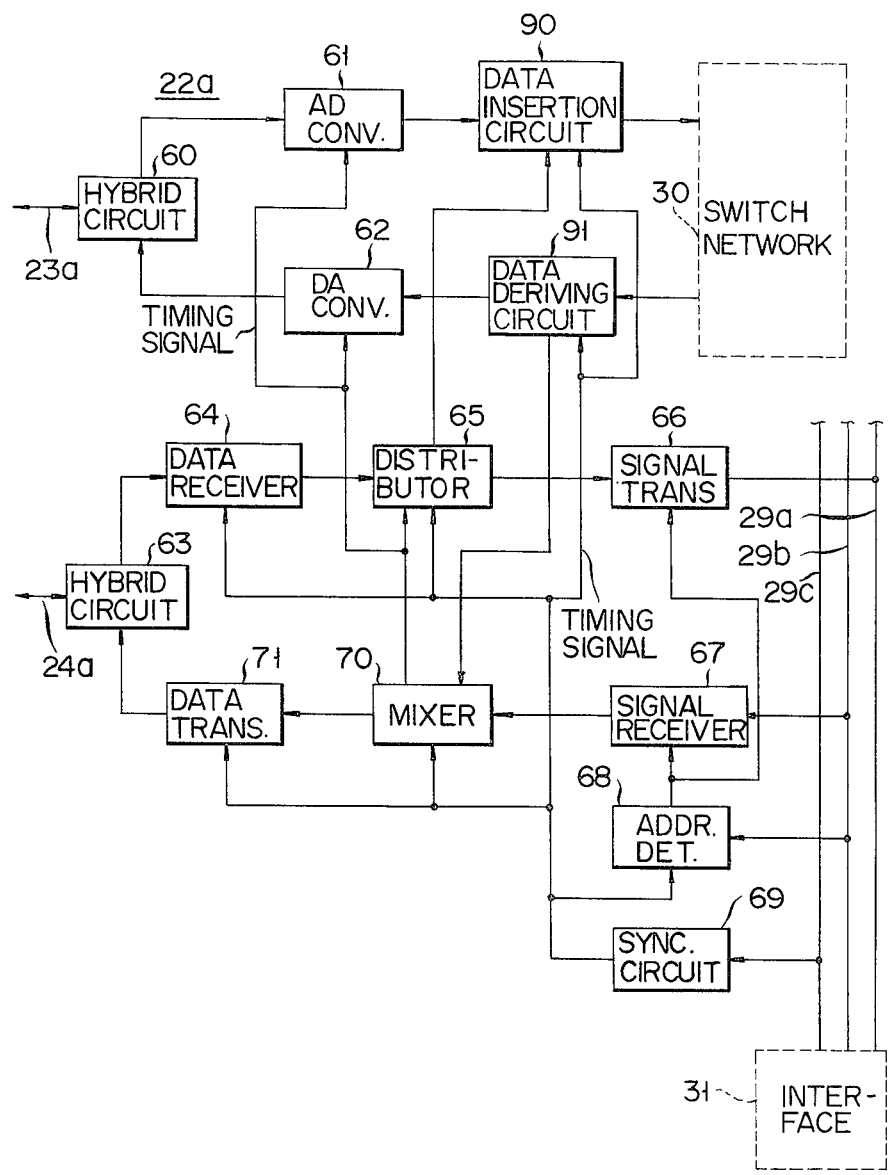
FIG. 5 shows a block diagram of the subscriber circuit shown in FIG. 1.

The subscriber circuit 22a will be used as a typical example of the subscriber circuits 22a to 22n for the detailed explanation of the subscriber circuit. Reference is made to FIG. 5 illustrating schematically the subscriber circuit 22a. A hybrid circuit 60 is connected at the input to the speech line 23a and at the receiving output terminal to an analogue to digital (A-D) converter 61. The A-D converter 61 samples the speech input signal at a fixed timing by using a timing signal from the mixer 70. For example, the sampling of the A-D converter 61 is performed at the interval of one frame in an exchanging system that the speech signals of 24 channels are time-division-multiplexed with each frame period. The analogue level at the sampling time is converted into a PCM signal of 8 bits, for example. The 8 bits PCM signal is then applied to the terminal data insertion circuit 90. The terminal data from the distribution circuit 65 is inserted into the PCM speech signal, by the data insertion circuit 90. The terminal data with the PCM speech signal inserted is then applied to the switch network 30. More precisely, the data insertion circuit 90 replaces the terminal data with the final bit (the 8th bit) of the 8-bits speech signal every six frames of the PCM speech signal, under control of the timing signal transferred from the synchronizing circuit 69. Through this operation, the PCM speech signal and the terminal data are multiplexed. Thus multiplexed signal is subjected to exchanging and control of the switch network 30.

A terminal data deriving circuit 91 consists of, for example, a switch circuit which receives a multiplexed signal passed through the switch network 30 to separate it into the PCM speech signal and the terminal data under control of the timing signal transferred from the control unit 32 (FIG. 1) through the interface 31 and the synchronizing circuit 69 (see FIG. 5). The terminal data separated is transferred to a mixer 70 while the PCM speech signal separated is transferred to a digital to analogue (D-A) converter 62. The D-A converter 62 converts the PCM speech signal into the corresponding analogue speech signal, responsive to the timing signal from the mixer 70. The speech signal is applied to the transmission input terminal of the hybrid circuit 60 and transmitted through the hybrid circuit 60 and the speech line 23a to reach the telephone 25a (FIG. 1). The receiving signal appearing at the receiving output terminal of the hybrid circuit 63 coupled with the control line 24a, is applied to a data receiver 64. The data receiver 64 equalizes and amplifies the receiving signal and feeds it to the distributing circuit 65. The distributing circuit 65 temporarily stores the receiving signal. The stored receiving signal is read out from the distributing circuit 65 by using the timing signal from the synchronizing circuit 69 and then is applied to the signal transmitting circuit 66. The signal transmitting circuit 66 amplifies the input signal and applies it to the control unit 32, through a data bus 29a which is a part of the subscriber control line 29 (FIG. 1), and the interface 31. The control signal on a data bus 29b which is a part of the subscriber control line 29 (FIG. 1), enters a signal receiving circuit 67 and an address detection circuit 68. The clock signal transferred from the clock generator 32C (FIG. 1) by way of the interface 31 and a synchronizing signal line 29c which is a part of the subscriber control line 29 (FIG. 1) is inputted to the synchronizing circuit 69 where the synchronizing signal is extracted. On the basis of the synchronizing signal extracted, the synchronizing circuit 69 forms various kinds of timing signals for controlling the operation timings of respective portions of the subscriber circuit 22a. The address detecting circuit 68 detects the address codes of itself from the control signal in response to the timing signal sent from the synchronizing circuit 69 so that it energizes the signal receiving circuit 67 or the signal transmitting circuit 66 to control the receiving or transmitting operation. Through this control, the control signal properly controlled in the signal receiving circuit 67 is applied to the mixer 70 where it is temporarily stored. The signal stored in the mixer 70 is read out therefrom at a proper timing by the timing signal applied to be sent to the data transmitting circuit 71. The input signal transmitted to the data transmitter 71 is amplified and then is applied to the transmitting input terminal of the hybrid circuit 63. The signal further goes to the telephone 25a (FIG. 1) through the hybrid circuit 63 and the control line 24a.

The distributing circuit 65 is controlled in its operation timing by the output signal of the synchronizing circuit 69, and operates on the basis of the control from the control unit 32 (FIG. 1). When the control signal directs the selection of the terminal data, the terminal data included in the receiving signal stored in the distribution circuit 65 is transmitted to the terminal data insertion circuit 90. For this, the terminal data, after being multiplexed together with the PCM speech signal, is subjected to the exchange and control of the switch network 30. The terminal data separated from the multiplex signal thus exchanged and controlled is stored temporarily in the mixer 70. The terminal data stored in the mixer 70 are read out at a predetermined timing and then are applied onto the control line 24a through the data transmitter 71 and the transmitting input terminal of the hybrid circuit 63.

Turning now to FIG. 6, there are shown detailed examples of the distributing circuit 65 and the mixer 70. In the distributing circuit 65, a buffer 72 stores temporarily the signal supplied from the data receiver 64 (FIG. 5). A synchronizing detection circuit 73 connected to the buffer 72 is to be transferred to other data terminal equipments than the data terminal equipment 26a or to the control unit 32 (FIG. 1). Thus, the synchronizing detection circuit 73 makes such a judging function based on the input clock signal. The signal stored in the buffer 72 is transferred to the buffer 76 or 77, through an AND gate 74 enabled by the output signal from the synchronizing detection circuit 73 or an AND gate 75 enabled by the output signal after passed through an inverter 78. The signal stored temporarily in the buffer 76 is outputted to the signal transmitting circuit 66 (FIG. 5) and the signal in the buffer 77 is outputted to the terminal data insertion circuit 90.

The control signal received by the signal receiver 67 (FIG. 5) is temporarily stored in the buffer 79 and then is applied to the timing signal generator 80. The timing generator 80 transmits timing signals for controlling the read-out and write-in operations of the buffers 76 and 77 and additionally timing signals for controlling the operations of the A/D converter 61 (FIG. 5) and the D/A converter 62 (FIG. 5). For example, when the terminal data inserted in the PCM speech signal is extracted, the timing signal from the timing generator 80 enables the gate 81 to permit the terminal data from the terminal data deriving circuit 91 to pass therethrough. The terminal data outputted from the AND gate 81 is temporarily stored in the buffer 82. The terminal data stored in the buffer 82 and the control signal stored in the buffer 79 are selectively read out therefrom through an AND gate 83 enabled by the output signal from the timing generator 80 and an AND gate 84 enabled by the signal inverted by an inverter 86. The output signal thus read out is outputted to the data transmitter 71 (FIG. 5) through the OR circuit 85.

By using the subscriber circuits 22a to 22n constructed as shown in FIGS. 5 and 6, the terminal data transferred among the data terminal equipments 26a to 26n may be multiplexed together with the PCM speech signal and may communicate with the switch network 30 without intervening by the control unit 32. Accordingly, the load of the control unit 32 against the subscriber circuits 22a to 22n is alleviated to permit a high speed and high efficient exchanging service. Additionally, the memory capacity necessary for the control unit 32 may be reduced with the result that the system is simplified in construction and reduced in cost.

As described above, in the system according to the embodiment of this invention, telephones with the functions making a speech and a data transfer are coupled with a PCM telephone exchange, through speech lines and control lines, and are coupled with data terminal equipments through data lines and terminal control lines. A transfer of the speech signal is performed between the telephone and the telephone exchange through the speech lines. The transfer of the time-division-multiplex signal of the telephone control signal and the terminal data and the multiplexed signal of the function signals and the terminal data between them is performed through the control lines. The terminal data is transferred between the telephone and the data terminal equipment through the data line, and the terminal control signal, through the terminal control line. With such a scheme, in the telephone exchange system, the speech signal from the telephone is pulse-code-modulated and the terminal data transferred through the control line is inserted into the PCM signal at a predetermined timing. The PCM signal with the terminal data inserted is then subjected to the exchange and control of the switch network. Following this, the terminal data is extracted from the PCM signal and the terminal data extracted is time-division-multiplexed together with the telephone control signal and the clock signal. The multiplex signal is sent to the telephone. The telephone discriminates the multiplex signal transferred from the telephone exchange to separate it into the telephone control signal, the clock signal and the terminal data and then to distribute them properly. The telephone also time-division-multiplexes the terminal data and the function signals and transfers the multiplexed one to the telephone exchange.

Accordingly, according to the system of the embodiment, the telephones 25a to 25k and the data terminal equipments 26a to 26k may commonly use the control lines 24a to 24k and the subscriber circuits 22a to 22k. Therefore, the number of the subscriber circuits is saved, particularly compared with the conventional system in which the telephones and the data terminal equipments must be connected to the corresponding subscriber circuits separately provided for exclusively the respective ones. The data terminal equipments 26a to 26k are generally installed near the telephones 25a to 25k. The lengths of the data lines 27a to 27k and the terminal control lines 28a to 28k are much shorter than those of the conventional system in which the data terminal equipments are directly connected to the telephone exchange remotely located. As previously mentioned, the terminal data to be transferred among the data terminal equipments is exchanged and controlled with insertion of it into the PCM speech signal by the switch network, without passing it into the control unit 32. Accordingly, the memory capacity necessary for the control unit for purpose of the data exchanging may be saved.

As described above, the automatic telephone exchange system of the invention enjoys many advantages. The subscriber circuits required for the exchanging service of the telephones and the data terminal equipments are small in number. The memory capacity for the control unit is small. This leads to simplification of the construction and reduction of cost.

What we claim is:

1. An automatic telephone exchange system comprising: a telephone exchange including a switch network, and a plurality of subscriber circuits; telephones connected to said switch network through speech lines, control lines, and said subscriber circuits; data terminal equipments connected to said telephone through data lines; each of said subscriber circuits including an A/D converter for converting a speech signal transferred through a speech line into a transmission signal, a distributing circuit for separating a time-division-muliplex signal transferred through a control line into terminal data of a data terminal equipment and control signals of a telephone, a terminal data insertion circuit for combining terminal data with a speech signal at a predetermined timing and sending an output of the terminal data insertion circuit to said switch network, a signal transmission circuit for transmitting a control signal separated by said distributing circuit, a terminal data deriving circuit for separating the speech signal and terminal data from an output transmission signal exchanged and controlled by said switch network, means for converting the speech signal separated by said deriving circuit into an analogue signal and for delivering the analogue signal to the speech line, means for time-division-multiplexing the terminal data separated by said terminal data deriving circuit, a control signal and a clock signal, and means for delivering multiplexed data to the control lines; said system further comprising voice converting means for converting the speech signal delivered through the speech line connected to said telephone into a signal recognizable by said telephone; speech signal generating means for converting a signal from said telephone into a speech signal; a receiving signal distribution circuit for separating the control signal and the terminal data from the time-division-multiplex signal transferred through the control line and for delivering the terminal data to the data line; a display control circuit controlled by the control signal separated by said receiving signal distributing circuit; means for generating a function signal corresponding to the operation of function keys; means for time-division-multiplexing the function signal and the terminal data of said data terminal equipment transferred through the data line therefrom; and means for transmitting the last time-division-multiplexed signal to a subscriber circuit through the control lines.

2. An automatic telephone exchange system comprising: a telephone exchange including a switch network, and a plurality of subscriber circuits; telephones connected to said switch network through speech lines, control lines and said subscriber circuits, and in which communication of a speech signal between two of said telephones is made through the speech lines and control signals including telephone control signals and function signals are transferred through the control lines; and data terminal equipments connected to said telephones through data lines; each of said subscriber circuits including an A/D convertor for converting a speech signal transferred through a speech line into a transmission signal, a distributing circuit for separating a time-division-multiplex signal transferred through a control line into terminal data of a data terminal equipment and control signals of a telephone, a terminal data insertion circuit for combining terminal data with a speech signal at a predetermined timing and sending an output of the terminal data insertion circuit to said switch network, a signal transmission circuit for transmitting a control signal separated by said distributing circuit, a terminal data deriving circuit for separating the speech signal and terminal data from an output transmission signal exchanged and controlled by said switch network, means for converting the speech signal separated by said deriving circuit into an analogue signal and for delivering the analogue signal to the speech line, means for time-division-multiplexing the terminal data separated by said terminal data deriving circuit, a control signal and a clock signal, and means for delivering multiplexed data to the control lines.

* * * * *